United States Patent [19]

Lingenfelter

[11] 4,177,388

[45] Dec. 4, 1979

[54] PROGRAMMABLE CONTROL FOR LOAD MANAGEMENT

[75] Inventor: Mike I. Lingenfelter, State College, Pa.

[73] Assignee: Louise D. Suhey, Pine Grove Mills, Pa.

[21] Appl. No.: 923,449

[22] Filed: Jul. 10, 1978

[51] Int. Cl.² .............................................. H02J 13/00
[52] U.S. Cl. ........................................ 307/38; 307/41; 307/39
[58] Field of Search ...................... 307/32, 35, 36, 37, 307/41, 52, 38, 57, 33, 34, 42, 39, 218, 241; 340/163, 166 R, 167, 147 R, 168 B; 364/492, 493; 179/18 GE

[56] References Cited

U.S. PATENT DOCUMENTS

| | | | |
|---|---|---|---|
| 3,723,753 | 3/1973 | Davis | 307/41 |
| 4,100,426 | 7/1978 | Baranowski | 307/41 |

Primary Examiner—George H. Miller, Jr.
Assistant Examiner—James L. Dwyer

Attorney, Agent, or Firm—Littlepage, Quaintance, Murphy, Richardson and Webner

[57] ABSTRACT

A programmable control for load management of a plurality of electrical power loads is disclosed which contains at least two groups of load controllers for controlling the power supply to loads connected to various pre-selected load controllers. A group selector selects which of the groups is functionally operative at any given instant in time based on environment or other criteria. A serial selector commonly connected to each of the load controllers in the groups serially selects one of the load controllers in each group for conduction for at least one period of the serial selector. There is provided a first set of programming points situated at the input to the load controllers. The programming points are selectively connected by wires or diodes in any desired fashion to modify the conduction period or order of the various load controllers. A restart delay mechanism is included, which is operative in the event of power failure, to delay the conduction on any of the load controllers for a period of time upon restoration of power.

7 Claims, 6 Drawing Figures

PROGRAMMABLE CONTROL FOR LOAD MANAGEMENT

BACKGROUND OF THE INVENTION

1. Field of the Invention

The present invention relates generally to electrical transmission and interconnection systems for plural load circuit control and particularly to such systems employing sequential selection of the controlled load circuits. The present invention relates particularly to apparatus for the control of electrical power demand in a plurality of loads so as to reduce the total system power requirements to a pre-selected maximum level.

Electrical utility systems have been designed to operate as nearly as possible in an optimal fashion while responding to customers' instantaneous demands for electrical power. In recent years, however, during periods of high electrical power demand, "brown-outs" and even "black-outs" have been a common experience, an experience which experts believe will become even more common in the absence of some widespread adoption of consumer load management. These brown outs and black outs which occur during emergency conditions are achieved by various relay schemes (under-frequency, under-voltage, over-current, etc.) resistor switching, and other power system stabilizing techniques which usually result in some form of load shedding. Typically, these load shedding schemes include voltage reduction, area black outs, volt power substation load curtailment, and disconnecting interruptable customers. Unfortunately, all but the last of these strategies disconnect loads in a gross fashion without recognizing the significance of individual loads which often results in customer dissatisfaction with utility performance and occasionally results in system-wide failure.

The efficiency of power production for a utility depends to a large extent on the uniformity and predictability of the level of power required to meet customer demand. In order to improve system efficiency, utilities have adopted billing practices designed to encourage customers to even out their power consumption and to avoid temporary over-loads that are incapable of being efficiently met by the power sources available to the utility. One practice is to charge the customer according to a usage formula that includes a factor based on the maximum power consumption in each of a succession of time intervals usually referred to as demand intervals. Utility meters have been developed for installation at the power entry point of the customer's facility for measuring both the total energy consumed during a billing period and the maximum energy used during the demand intervals.

The customer is thereafter billed a disproportionately higher amount for power consumed during the high demand intervals thereby encouraging the customer to regulate or manage his power consumption. This customer level load management also permits an overall reduction in power consumption since some uses for the power, once postponed, will be eliminated or at least diminished. Customer level load management still provides for essential services to the customer and generally provides for higher system-wide reliability, thereby increasing customer satisfaction with utility performance.

2. Description of the Prior Art

Various customer level load management schemes have been proposed based on a cycling or deferment of loads from periods of high power demand to periods of lower power demand. Load shedding then occurs in response to a signal indicating that electrical power usage has exceeded defined permissible limits. Unfortunately, such systems generally have a tendency to shed maximum loads towards the end of demand periods frequently causing relatively rapid change of loads which is not only annoying to the customer but also objectionable to the power utility as it causes periodic power surges in the lines. Commonly such systems make no provision to limit the number of stages or loads on or off and as a result the customer does not take advantage of the potential savings inherent in peak shaving at all times rather than just during periods of maximum power consumption.

Other customer level load management systems found in the prior art employ motor driven rotary switches, solenoid-actuated stepping switches, or equivalent solid state devices to connect a series of customer loads in a certain sequence and, after a certain period of time or upon sensing of a certain external condition, disconnecting the customer loads in the same or opposite sequence. The sequence is then repeated cyclically so as to maintain the load at a desired load level condition. While load management of this fashion is generally preferred over the line condition responsive systems previously reviewed, a common failure of most systems is the inability to change the sequence in response to varying external environmental conditions and the absence of any means for avoiding start-up transients in the event of system-wide power failure.

Examples of the prior art are to be found in U.S. Pat. Nos. 3,205,368; 3,489,913; 3,659,114; 3,714,453; 3,984,699; and 4,031,406.

SUMMARY OF THE INVENTION

The present invention provides for a significant improvement over prior load management devices by including a programmable control comprising at least a first and a second group of load control means for controlling power supplied to loads connected to preselected ones of the load control means. Loads can be connected to the load control means present in one or more than one group depending on operational requirements of the particular electrical load in question. The programmable control also comprises a group selector means for selecting which of the groups is functionally operative at any given instant in time. The group selector means can be manually operable or responsive to various external conditions such as date-time, line condition, or environment condition. The programmable control also comprises a serial selector means, commonly connected to each of the load control means in all of the groups, for serially selecting one of the load control means in each group for conduction for at least one time period for the serial selector means. The time period of the serial selector means is provided by a clock the time base of which can be modified by the group selector means. The programmable control also comprises at least a first set of programming points, each point situated at an input to a load control means common with an output of the serial selector means. The programming points can be selectively connected together by various means for modifying the duration or order of the conduction state of one or more of the load control means. The programmable control also comprises means operative in the event of a power failure for delaying for a period of time the conduction on any of the load control means upon restoration of power thereby protecting the various electrical loads from unwanted line conditions subsequent to utility system failure.

While the serial selector means normally includes an appropriate re-setting mechanism to ensure cyclical operation of the serial selector means, the programmable control can also comprise means connected to a selected programming point and to the serial selector means for truncating the serial selector cycle. The programmable control can also comprise a second set of programming points, each point being situated at an output of the load control means and adaptable for further modification of the duration or order of the conduction states of the various load control means. Visual indicators can be connected to the outputs of each of the load control means for indicating the operable state of each load control means.

Other various features of the present invention will become apparent to those skilled in the art upon consideration of the following description of preferred embodiments taken together with the accompanying figures.

DESCRIPTION OF THE PREFERRED EMBODIMENTS

Figure 1:
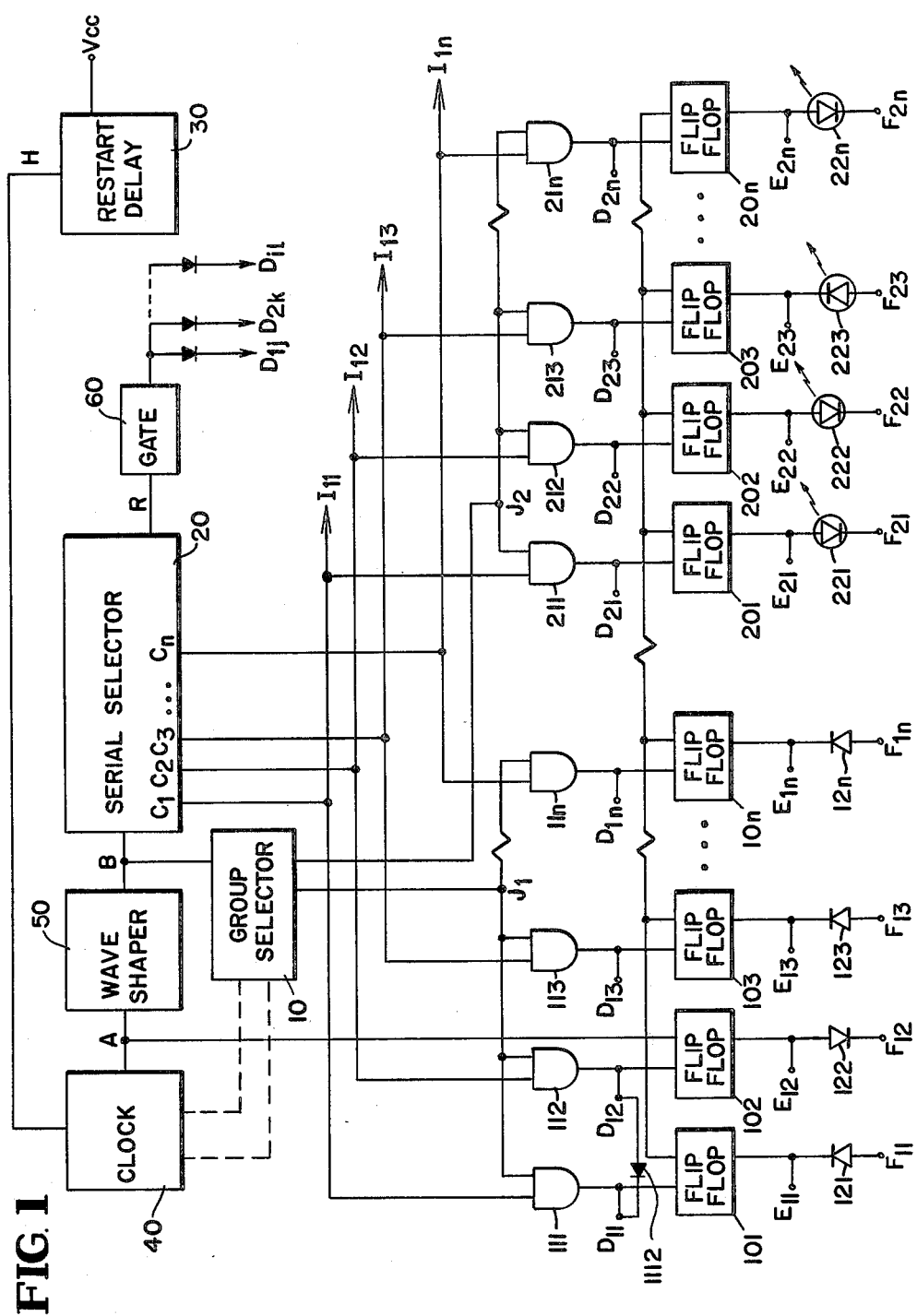
FIG. 1 is a schematic block diagram of the principal components of a programmable control system according to the present invention.

A programmable control for load management of a plurality of electrical power loads according to the present invention is illustrated in block fashion generally in FIG. 1. The programmable control comprises a first group of load control means 101, 102, 103, ..., 10n, and a second group of load control means 201, 202, 203, ..., 20n. The load control means, while illustrated to be an R-S flip-flop, can be any means for controlling the power supplied to a load attached to the output of such a device. A group selector means 10 is provided for selecting which of the groups of load control means is to be functionally operative at any given instant in time. The group selector means 10 is logically connected to the two groups of load control means at points J1 and J2.

A serial selector means 20 is commonly connected to each of the load control means in all of the groups; that is, output C1 of the serial selector means is at all times logically connected to both load control means 101 and load control means 201. The serial selector means periodically serially selects one of the load control means in each group for conduction for at least one period of the serial selector means. The output of the serial selector means 20 and group selector means 10 are both fed to an intermediate logic element 111, 112, 113, ..., 11n, 211, 212, 213, ..., 21n, which uniquely selects a single load control means to be triggered into a conduction state. A first set of programming points D11, D12, D13, ..., D1n, D21, D22, D23, ..., D2n, are provided, each point situated at an input to a corresponding load control means. Various circuit elements, such as diode 112, can be connected to the first set of programming points D so as to modify the duration or order of the conduction state of the load control means as well as re-set the serial selector means as will become apparent from the subsequent description of FIGS. 4 and 5.

A re-start delay means 30 is provided which is operative in the event of a power failure to delay for a period of time the conduction on any of the load control means upon restoration of power. As will become apparent from a later discussion of FIG. 6, the serial selector means 20 selects the various load control means in response to a timed signal produced by clock 40. The re-start delay means 30 operates to change the output of clock 40 so as to maintain a constant re-set signal on all of the load control means for a period of time following restoration of power thereby preventing any of the load control means from delivering power to the various loads attached thereto. Preferably, a wave shaper 50 is included between the clock 40 and the serial selector 20 so as to assure a selection signal from the serial selector and group selector of significantly longer duration than the momentary re-set signal which is produced by clock 40.

The serial selector 20 which can be a decade J-K counter, or the like, will typically include an internal re-set such that after the counter has selected the n (for example 10) available outputs, the counter will re-start the series at the first output C1. Preferably, the serial selector 20 will also have an external re-set R which can be preceded by an appropriate logic gate 60 to permit selective connection between the input G of gate 60 and one or more of the programming points D. In this manner, the length of the series which is executed by the serial selector can be arbitrarily truncated at any desired point and will be further described in connection with FIG. 4.

While FIG. 1 illustrates only two groups of load control means, it will appreciated by those skilled in the art that any number of similar groups of load control means could be appropriately connected at points I11, I12, I13, ..., I1n. The programmable control illustrated in FIG. 1 also includes a second set of programming points, E11, E12, E13, ..., E1n; E21, E22, E23, ..., E2n, each point situated at an output of the corresponding load control means. This second set of programming points E can be used in a manner similar to the first set of programming points D to modify the conduction state, duration, or order of selection of the various loads connected to the outputs of the load control means at F11, F12, F13, ..., F1n, and F21, F22, F23, ... F2n. Diodes 121, 122, 123, 12n and 221, 222, 223, ..., 22n, are included to ensure proper signal polarity to the various outputs F and can be light emitting diodes for visually indicating the operable state of each load control means. Current limiting resistors can also be included in the circuit at this point, although not here illustrated.

Figures 2, 3:
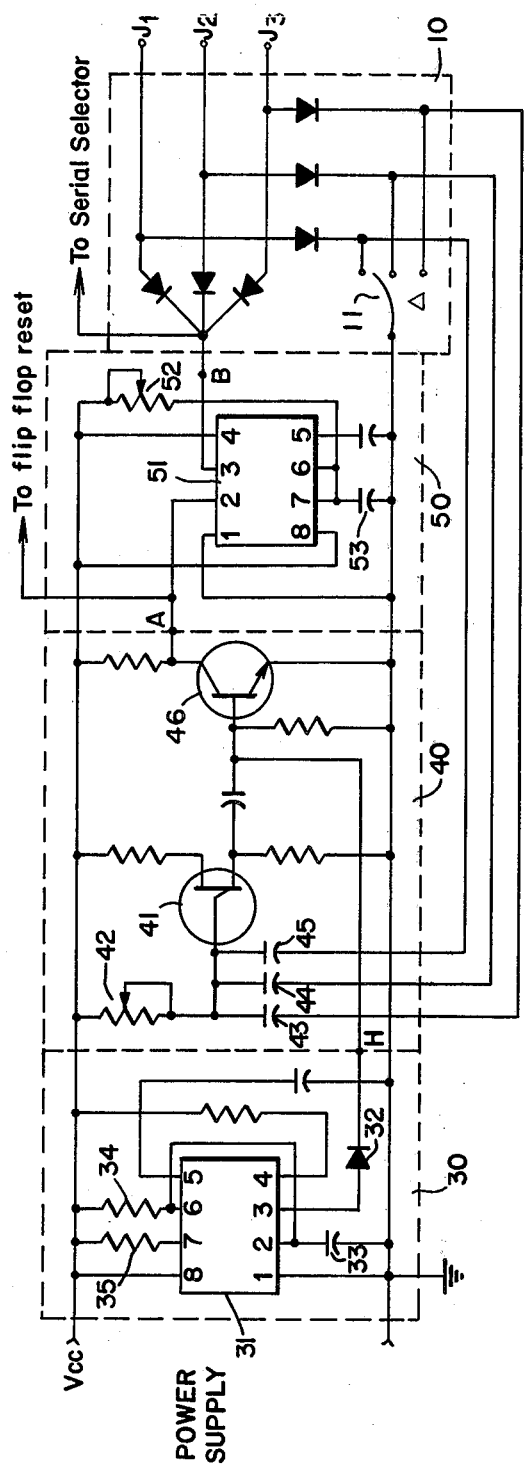
FIG. 2 is an example of a load circuit which can be connected to the output of the programmable control of the present invention.
FIG. 3 is a schematic diagram of a preferred embodiment for a portion of the programmable control illustrated in FIG. 1.

The outputs F of the various load control means can be connected to the trigger circuit of a triac as illustrated in FIG. 2 placed in series with the various loads. The output F might also operate on a thyristor, thyratron, relay, or other device capable of maintaining for the desired period of time the continuous conduction of power to the selected load or loads from the load power source.

FIG. 3 illustrates schematically a preferred circuit for the group selector 10 re-start delay means 30, clock 40, and wave shaper 50. In the circuit illustrated, a periodic spike pulse is produced by the Josephson junction transistor 41 as a function of the value of resistor 42 and capacitors 43-45. In the absence of any external signal at point H, which will be described later, this spike signal is followed by transistor 46 with the output appearing at point A. The signal at point A is employed as a re-set signal to all of the load controlling flip-flops and is fed into a timing circuit 51 which is illustrated as an integrated circuit suffix-555 commonly available from several manufacturers. The positive moving slope of the spike signal at point A when fed to terminal 2 of the -555 monolithic timing circuit causes a similar positive moving output to appear on terminal 3 of the same circuit. The output at terminal 3 remains positive for a period of time determined by the value of resistor 52 and compacitor 53 and then returns to a 0 level. The relationship between the signals at point A and B is illustrated graphically in FIG. 4. The signal output at point B from the wave shaper 50 is fed to the serial selector so as to cause it to produce an output signal similar to the signal at point B at the "next" output C. This is graphically illustrated by noting in FIG. 4 the output of circuit C1, C2 and C3 for adjacent pulses present at points A and B.

The output signal at point B is also fed to group selector 10. The group selector 10 illustrated is of a type which shorts to ground all but one of the output signals available to points J1, J2 and J3. The selection of which output J is to be operable is determined by switch 11 which can be manually controlled or controlled by line condition but is preferably controlled by environmental conditions. It will be appreciated that any of a number of switching mechanisms might be substituted for switch 11 to perform the intended function, for example, a thermostatically controlled switch. It will be also noted that switch 11 controls which of capacitors 43-45 are grounded thereby providing for variation in the time constant establishing the period of clock 40.

As illustrated in FIG. 3 a pulse would be provided from the output J1 of the group selector 10 of essentially the same duration and polarity as the signal present at point B. Since, as was previously indicated, the output of the serial selector at C would mirror the output at B, essentially coincident pulses appear on both inputs to one of gates 111, 112, 113, . . . , 11n, the output of which appears at terminal D as illustrated on lines D11 and D12 of FIG. 4. The negative rather than positive pulse results from the selection of NAND gates and the selection of negative logic flip-flops for use in FIG. 1. It will be appreciated by those skilled in the art that the use of AND gates and positive logic flip-flops might be employed with appropriate circuit modifications.

Figure 4:
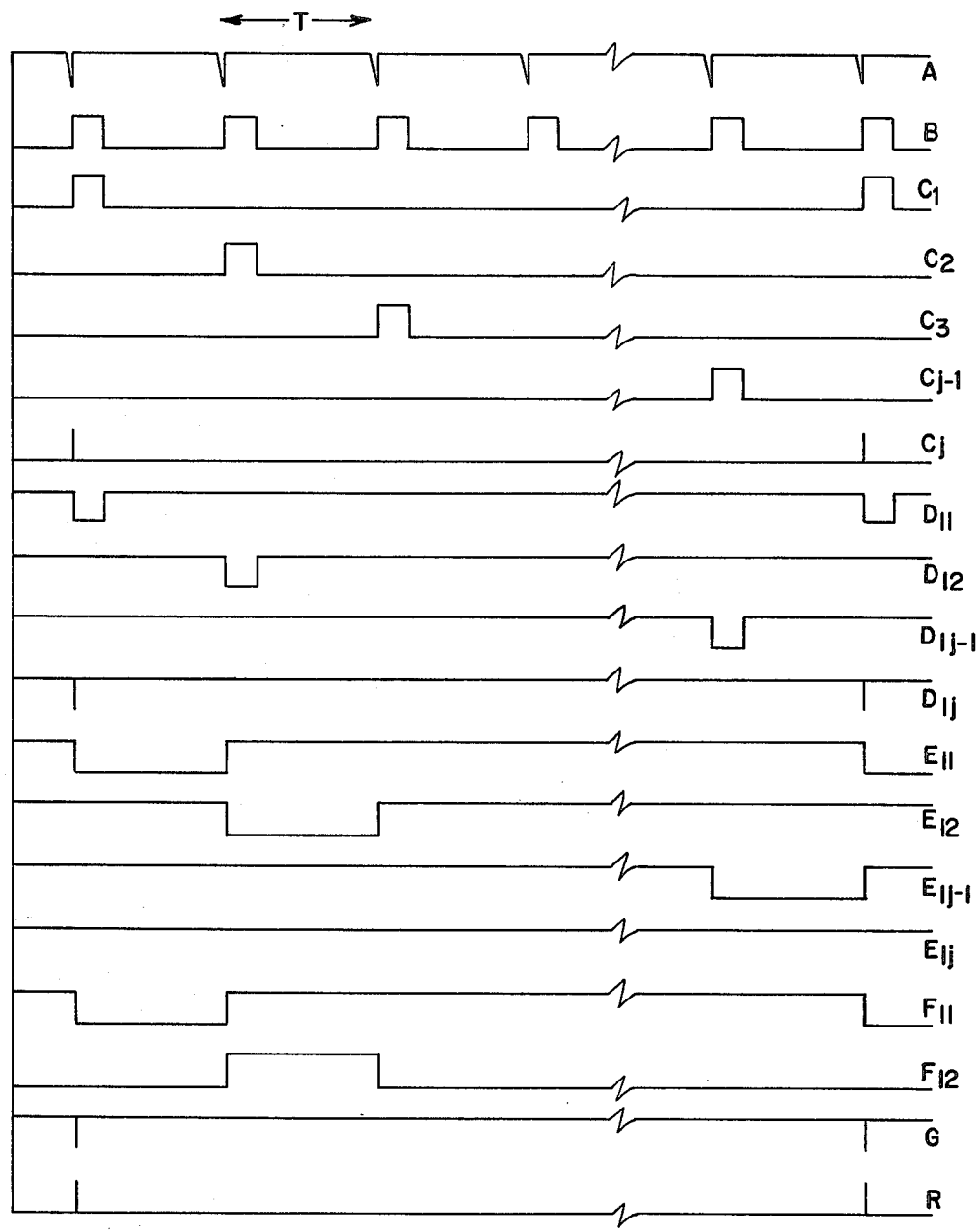
FIG. 4 is a plurality of graphs all drawn to the same horizontal time scale depicting the various signals occurring at points within the circuit illustrated in FIG. 1.

The remaining graph lines shown in FIG. 4 relate to the circuit as shown in FIG. 1 absent diode 112 and are useful for considering the basic function of that circuit.

A discussion of the operation of the same circuit including diode 1112 is included later in connection with Example I of FIG. 5. In FIG. 4 note that the presence of a signal at point D11 sets flip flop 101 so that a low state exists at terminal E11. At the next timing signal A flip flop 101 is re-set to its original condition and flip flop 102 is triggered by the signal at D12 to a low state as illustrated at output E12. The operation of diodes 121 and 122 is similarly graphically illustrated by considering the signals present at F11 and F12. Please note that these states assume the absence of diode 1112 and that there is connected to F11 and F12 an appropriate load as illustrated in FIG. 2 or as otherwise previously discussed.

While, as previously indicated, the serial selector means conventionally includes an internal re-set so that after selecting all n available output terminals, the series again begins at terminal C1, it is possible to truncate the series by connecting one of the programming points D to the input G of gate 60. In FIG. 1 and FIG. 4 we have assumed that programming point D1$i$ (where i is less than n) has been connected to input G with an appropriate diode as illustrated. It is then instructive to look at and consider the signals present at the j-1st, jth, and first terminals of points C, D, E, G and R. When the serial selector selects the j-1st terminal, a pulse appears at that terminal coincident with B which causes an appropriate signal to appear at programming point D1j-1 and also causes flip-flop 10j-1 to assume a set condition indicated by output E1j-1. At the next pulse A, a momentary pulse appears at Cj coincident with the leading edge of pulse B which causes a momentary pulse at programming point D1j. This momentary pulse at point D1j also appears at input G to gate 60 which by appropriate logic is passed through to the re-set gate R of the serial selector which immediately selects terminal C1. This re-set occurs within the duration period of pulse B as set by resistor 52 and capacitor 53 so that the presence of the coincident signal at B and C1 causes the appropriate output signal to appear at programming point D11 thereby setting flip-flop 101 as previously discussed.

Figure 5:
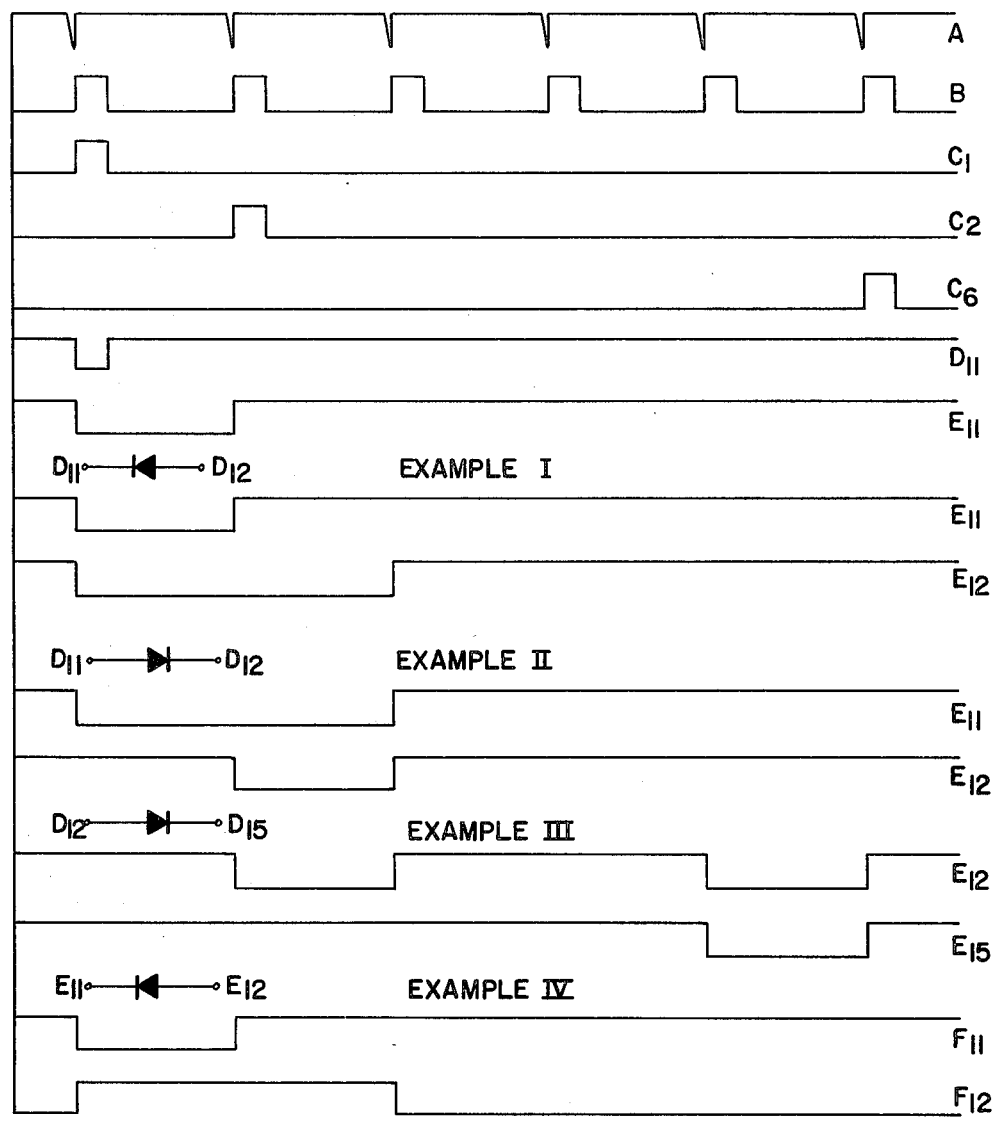
FIG. 5 is a plurality of graphs all drawn to the same horizontal time scale depicting various signals occurring in points within the circuit illustrated in FIG. 1 as modified by the inclusion of various programming elements connected to selected points of the circuit.

Additional uses for the programming points D and E are graphically illustrated in FIG. 5 where it is assumed for matter of simplicity that terminals C1 through C6 are serially selected with the group selector set as shown in FIG. 3. The first line D11 and first line E11 illustrate the potential states existing at those two points in the absence of any connection being made to programming point D11. Thereafter are provided four examples which it is believed will illustrate the programmable features of the present invention and teach one of ordinary skill in the art the various modifications which can be made to a programmable control for load management according to the present invention.

In Example I, the diode 1112 is connected as illustrated in FIGS. 1 and 5 between programming points D11 and D12. Beneath the illustrated diode is FIG. 5 there are illustrated the conduction states for terminals E11 and E12. Note that the conduction state of E12 is now prolonged while the conduction state of E11 is unaffected.

In Example II, the polarity of the diode 1112 between programing points D11 and D12 is reversed and correspondingly the conduction state of E11 is now prolonged while the conduction state of E12 is unaffected. It will be appreciated by those skilled in the art that if a solid wire were connected between points D11 and D12 this would amount to the sum of Examples I and II and that the conduction states of E11 and E12 would both be prolonged for the specified length of time.

Example III similarly illustrates the presence of a diode between D12 and D15. It is to be noted that when the diode is inserted as illustrated the conduction state of point E12 is modified so as to be operative during both the period of normal conduction of E12 and the period of conduction of E15 while the conduction state of point E15 remains unchanged. It will be appreciated by those of ordinary skill in the art that a reversal of the diode illustrated in Example III would result in no variation from normal of the conduction state of E12 but would cause E15 to exhibit two conduction periods, one during the second and one during the fifth time period. Similarly, the existence of a solid wire between points D12 and D15 would result in conduction states existing at both terminals E12 and E15 during both the second and fifth time periods.

Example IV illustrates in similar manner the output modification to be observed at terminal F11 and terminal F12 if a diode were to be placed between programming points E11 and E12. Any number of programming diodes or wires may be selectively connected to the programming points for modifying the duration or order of the conduction states of any of the various load control means or for modifying the output of the various load control means. Where there are provided two groups of load control means each group containing eight load control flip flops as illustrated, it has been calculated that some 614,400 different programs are possible. It will be appreciated that many of these are merely redundant of similar programs but this large number does reflect the flexibility presented by a programmable control according to the present invention.

An important feature of the programmable control is the re-start delay 30 which consists of a timing circuit 31 which, similar to timing circuit 51, can be an integrated circuit suffix-555 commonly available from many manufacturers. With the timing circuit 31 positioned as indicated, the initial presence of a dc potential (Vcc) on the power supply causes a pulse to occur from output terminal 3 which passes through diode 32 to point H. This potential remains for a period of time established by the time constant of capacitor 33 in combination with resistors 34 and 35. The potential on output terminal 3 and hence at point H then returns to 0 and remains at that potential until such time as a major line voltage fluctuation occurs which would again trigger the change of potential at output 3. This is illustrated graphically in FIG. 6 wherein it is assumed that the line potential has been at the desired potential (Vcc) for an extended period of time to point t1 where a major line voltage reduction occurs which extends to some subsequent time t2 where the initial line voltage is restored. Note that there is no change in potential H at point t1 but that on restoration of power at point t2 an output signal H from the re-start delay 30 occurs.

Figure 6:
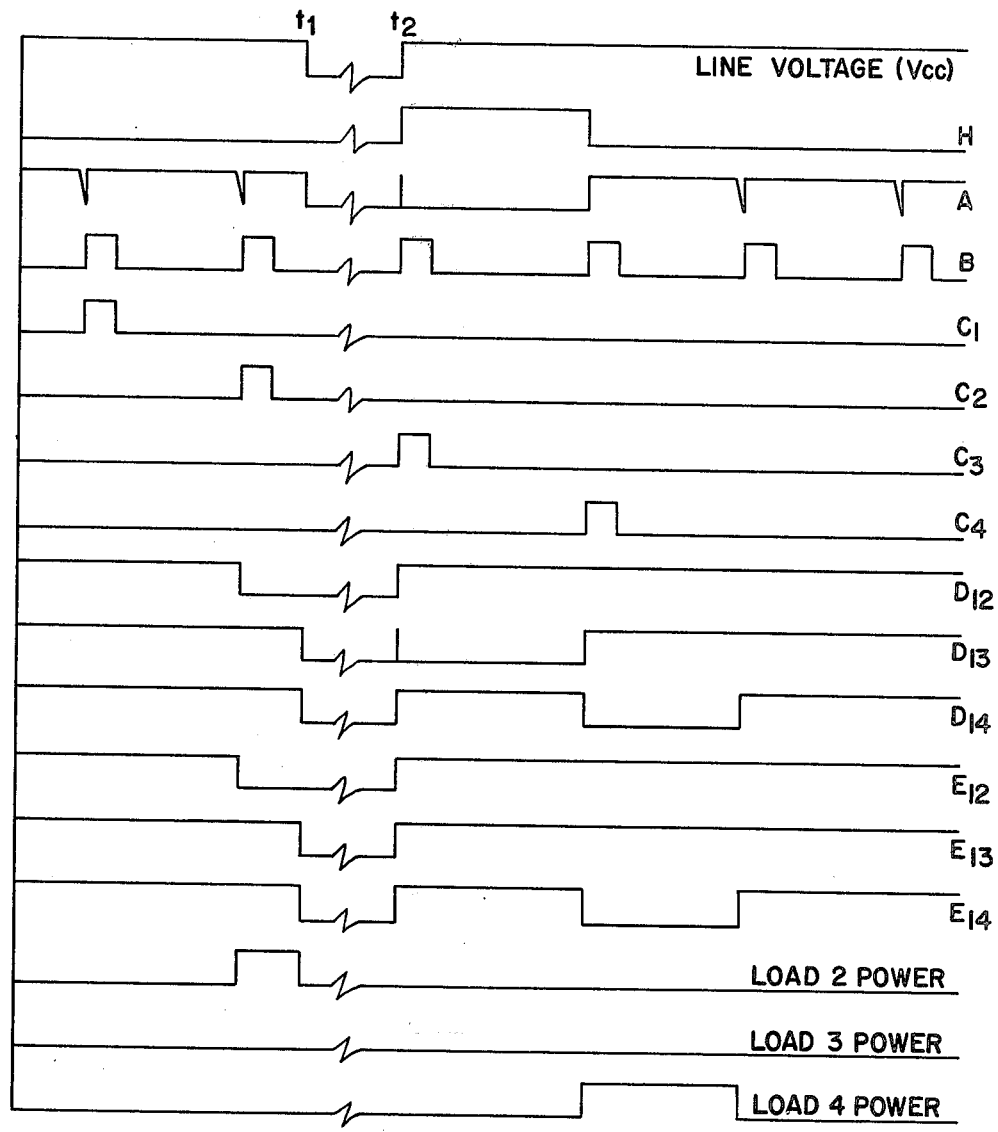
FIG. 6 is a plurality of graphs all drawn to the same horizontal time scale depicting the various signals occurring at points within the circuit illustrated in FIG. 1 in the event of an external power failure and subsequent restoration of power.

The output H of the re-start delay is shown in FIG. 3 to be injected between the initial spike generator 41 and transistor follower 46 in such a way that any pulses generated by the pulse former 41 would be masked by the injected signal, ignored by the following transistor 46 and would not appear at point A. The potential output at point A is illustrated in FIG. 6. Note that upon restoration of the line voltage at point t2 a momentary spike would appear at point A but that A would return to a low state which for the duration of the presence of signal H would continuously trigger a re-set in all of the flip-flop control means. While this momentary spike would be reflected by the normal occurrence of a conduction state on the set side of the flip-flop control means under consideration, the continuous presence of a signal on the re-set side of the flip-flop control means would prevent any output thus inhibiting the power load controlled by that load controller from operation for the duration of the presence of the signal at point H. This is reflected graphically by examining the power supplied for loads 2, 3 and 4 at the bottom of FIG. 6. Note that since the power failure occurred during the operation of load 2, load 3 is entirely skipped during the sequence and that when the re-set delay signal H returns to a 0 value load 4 is provided with power.

The presence of the re-start delay in the programmable control of the present invention provides the utility supplying the customer having such a device with the advantage of not facing any power demands from the particular customer during start-up. It also has the advantage of protecting the customer's equipment, such as compressors and the like, from the large transients which are usually present on power lines at the moment of restoration of power. Preferably, the time period for the re-set delay mechanism is selected such that it satisfies any minimum shut down period required by any of the loads controlled by the programmable control.

Although the invention has been described in considerable details with reference to certain preferred embodiments thereof, it will be understood that variations and modifications can be effective within the spirit and scope of the invention as described above and as defined in the appended claims.

What is claimed is:

1. A programmable control for load management of a plurality of electrical power loads, the programmable comprising:
    (a) at least a first and a second group of load control means for controlling the power supplied to loads connected to pre-selected ones of the load control means,
    (b) a group selector means for selecting which of the groups is functionally operative at any given instant in time,
    (c) a serial selector means, commonly connected to each of the load control means in all of the groups, for serially selecting one of the load control means in each group for conduction for at least one period of the serial selector means,
    (d) at least a first set of programming points, each point situated at an input to a load control means logically common with the output of the serial selector means,
    (e) means selectively connecting at least two of the first set of programming points together for modifying the duration or order of a conduction state of at least one of the load control means, and
    (f) means operative in the event of a power failure for delaying for a period of time the conduction on any of the load control means upon restoration of power.

2. The programmable control of claim 1 further comprising means connected to at least one of the first set of programming points for re-setting the serial selector means after completing selection of less than all of the load control means in at least one of the at least two groups.

3. The programmable control of claim 1 wherein the group selector means comprises a thermostatically controlled switch for selecting one of the at least two groups based on the environmental conditions.

4. The programmable control of claim 1 further comprising a second set of programming points, each point situated at an output of a load control means.

5. The programmable control of claim 1 further comprising a light emitting diode connected to the output of each of the load control means for visually indicating the operable state of each load control means.

6. The programmable control of claim 1 wherein the group selector means further comprises means for varying the period of the serial selector means.

7. The programmable control of claim 1 wherein each of said load control means comprises an R-S flip-flop, a light emitting diode connected to the output of the R-S flip-flop, the light emitting diode being in turn connected to the trigger gate of a triac connected in series with a power load.

* * * * *

UNITED STATES PATENT OFFICE
CERTIFICATE OF CORRECTION

Patent No. 4,177,388          Dated Dec. 4, 1979

Inventor(s) Mike I. Lingenfelter

It is certified that error appears in the above-identified patent and that said Letters Patent are hereby corrected as shown below:

On the face of the patent at section 73, the assignee is listed incorrectly.

73  Assignee:  Delete "Louise D. Suhey, Pine Grove Mills, Pa."

Add -- Mark III Systems, Inc., State College, Pa.--

Signed and Sealed this

Eighth Day of April 1980

[SEAL]

*Attest:*

SIDNEY A. DIAMOND

*Attesting Officer*    *Commissioner of Patents and Trademarks*